(12) United States Patent
Woods et al.

(10) Patent No.: US 8,152,872 B2
(45) Date of Patent: Apr. 10, 2012

(54) MODULAR REFORMER WITH ENHANCED HEAT RECUPERATION

(75) Inventors: Richard Root Woods, Irvine, CA (US);
Brook F. Porter, Playa Vista, CA (US);
Rahul Iyer, Long Beach, CA (US);
Leonard M. Weschta, Long Beach, CA (US)

(73) Assignee: Intelligent Energy, Inc., Long Beach, CA (US)

( * ) Notice: Subject to any disclaimer, the term of this patent is extended or adjusted under 35 U.S.C. 154(b) by 839 days.

(21) Appl. No.: 10/598,394

(22) PCT Filed: Mar. 9, 2005

(86) PCT No.: PCT/US2005/007882
§ 371 (c)(1),
(2), (4) Date: Aug. 15, 2008

(87) PCT Pub. No.: WO2005/087360
PCT Pub. Date: Sep. 22, 2005

(65) Prior Publication Data
US 2008/0295403 A1    Dec. 4, 2008

Related U.S. Application Data

(60) Provisional application No. 60/551,452, filed on Mar. 9, 2004.

(51) Int. Cl.
*B01J 7/00* (2006.01)
*B01J 8/00* (2006.01)

(52) U.S. Cl. ............. 48/61; 48/127.9; 48/127.1; 48/93; 48/94; 48/95; 60/780; 422/600; 422/601; 422/602; 422/629; 422/643

(58) Field of Classification Search .................. None
See application file for complete search history.

(56) References Cited

U.S. PATENT DOCUMENTS

| 5,180,651 | A |   | 1/1993  | Mason              |         |
|-----------|---|---|---------|--------------------|---------|
| 5,227,256 | A | * | 7/1993  | Marianowski et al. | 429/423 |
| 5,270,127 | A |   | 12/1993 | Koga et al.        |         |
| 5,316,747 | A | * | 5/1994  | Pow et al.         | 423/247 |

(Continued)

FOREIGN PATENT DOCUMENTS

DE        19909180        9/1999

(Continued)

OTHER PUBLICATIONS

Supplemental European Search Report from corresponding EP Application No. 05725200.9.

(Continued)

*Primary Examiner* — Kaity V. Handal
(74) *Attorney, Agent, or Firm* — Baker & Hostetler LLP

(57) ABSTRACT

The thermal reformer system (1) is provided that compromises a planar assembly including a reformer zone (5), a combustion zone (6), and various inlet and outlet manifolds with associated fluid flow passages (11, 20). The reformer system further compromises an inlet combustion fluid flow passage (31) connecting an inlet combustion fluid manifold (30) and the combustion zone (6), and an outlet combustion fluid flow passage (41) connecting the combustion zone (6) and the outlet combustion fluid manifold (40). In the thermal reformer system the heat transfer and recuperation from outlet fluid flows is efficiently transferred to inlet fluid flows, in order to minimize heat loss and insulation requirements.

9 Claims, 5 Drawing Sheets

U.S. PATENT DOCUMENTS

| | | | |
|---|---|---|---|
| 5,348,814 A | 9/1994 | Niikura et al. | |
| 5,609,834 A | 3/1997 | Hamada et al. | |
| 6,159,358 A | 12/2000 | Mulvaney, III et al. | |
| 6,159,434 A * | 12/2000 | Gonjo et al. | 422/626 |
| 2002/0045078 A1* | 4/2002 | Kawasumi et al. | 429/20 |
| 2002/0131919 A1* | 9/2002 | DeBellis et al. | 422/188 |
| 2003/0159799 A1 | 8/2003 | Broeker et al. | |
| 2005/0005521 A1* | 1/2005 | Kaye et al. | 48/215 |
| 2009/0326279 A1* | 12/2009 | Tonkovich et al. | 568/487 |

FOREIGN PATENT DOCUMENTS

| | | |
|---|---|---|
| JP | 62160136 | 7/1987 |
| WO | WO 01/35043 | 5/2001 |

OTHER PUBLICATIONS

International Search Report for PCT Application No. PCT/US05/07882.

* cited by examiner

MODULAR REFORMER WITH ENHANCED HEAT RECUPERATION

CROSS-REFERENCE TO RELATED APPLICATIONS

This application is a national stage filing under 35 U.S.C. 371 of International Application PCT/US2005/007882, filed on Mar. 9, 2005, which claims the benefit of U.S. Application No: 60/551,452, filed on Mar. 9, 2004. The entire teachings of the referenced Application is incorporated herein by reference. International Application PCT/US2005/007882 was published under PCT Article 21(2) in English.

BACKGROUND

1. Field

The present invention relates generally to chemical reformers and more particularly to thermally driven reformers used for the production of hydrogen, and more particularly to hydrogen reformers fuelled by gaseous or liquid hydrocarbon fuels, organic fuels, and hydrogen containing compounds such as ammonia. The hydrogen generated in the reformer can be purified or not and can be used for integration with fuel cell systems and/or hydrogen refueling stations.

2. Background Art

The thermal reforming method uses a thermal energy reactor to decompose fuel into hydrogen and other compounds. This decomposition is typically done in the presence of a catalyst but does not have to include catalysts. Hydrocarbon and organic fuels are typically decomposed in the presence of water and typically produce hydrogen, carbon dioxide, and carbon monoxide. Thermal cracking-type reformers typically do not use water, and therefore, also produce solid carbon or nitrogen if ammonia is utilized as the fuel. The most typical thermal reformer used in industry is a steam reformer type reactor, but other reactors can also include oxygen, which are known as auto thermal reformers and partial oxidation reformers. These reformers can be integrated with pre and post reactors such as steam generation and water gas shift reactors to create a fuel processing system.

In applications such as fuel cell systems and hydrogen refueling stations the efficiency of the hydrogen generation equipment can be critical to overall system economics when the energy value of hydrogen is converted into electricity. Similarly, reformers that are more compact with smaller foot prints and packaging flexibility are needed to reduce equipment cost and enhance the cost effectiveness of integrated system. In addition, fuel cell and hydrogen refueling applications are not homogeneous in capacity, some applications requiring only a few kilowatts and some requiring several hundred kilowatts. As a result, a reformer engineered for 25 kW applications must be completely re-engineered for a 2 kW or a 100 kW application. What the market needs are reformers with greater efficiency, enhanced compactness, and improved modularity.

SUMMARY

In an aspect, a thermal reformer system has a planar geometry, heat exchanger type, modular reformer with integrated thermal energy recuperation.

In an aspect, a thermal reformer includes sheet metal construction designed such that process gases flow from inlet manifolds, located at outer edges, inward toward a higher temperature primary reactor zone located centrally at a core and such that reactor products flow outwardly toward outlet manifolds also located on the outer edges and such that the inward flowing gases and the outward flowing gases are in thermal contact to enhance energy recuperation within the planar (sheet metal) construction of the thermal reformer.

In an aspect, a thermal reformer has (sheet metal) planar geometry, heat exchanger type, modular construction designed such that 1) reformate process gases flow from manifolds located on the outer edges, inward toward a primary reactor zone; 2) combustor inlet gases enter manifolds in the center of the structure and flow outward toward the reactor zone; 3) reformate and combustion products flow outwardly toward manifolds also located on the outer edges; 4) primary reactor zone(s) is located between the outside manifolds and the inside manifold(s); 5) inward flowing reformate process gases and the outward flowing reformate and combustion product gases are in thermal contact to enhance energy recuperation within the planar (sheet metal) structure of the thermal reformer.

In an aspect, a planar (sheet metal) geometry, modular thermal reformer includes modular reformer elements each substantially consisting of all process reactors and heat exchangers such that when stacked one on the other form a thermal reformer package/assembly with variable capacity based on the number of modular reformer elements included in the stack.

In an aspect, a thermal reformer system comprises a planar assembly including a reformer zone, a combustion zone, an inlet reformate process fluid manifold, an outlet reformate process fluid manifold, an inlet combustion fluid manifold, an outlet combustion fluid manifold, an inlet reformate process fluid flow passage connecting the inlet reformate process fluid manifold and the reformer zone, an outlet reformate process fluid flow passage connecting the reformer zone and the outlet reformate process fluid manifold, an inlet combustion fluid flow passage connecting the inlet combustion fluid manifold and the combustion zone, and an outlet combustion fluid flow passage connecting the combustion zone and the outlet combustion fluid manifold. The reformer zone and combustion zone are in thermal contact to promote transfer of combustion heat into the reformer zone to drive a reaction in the reformer zone. An exemplary reaction is a reformation reaction that produces at least hydrogen as a product.

In some exemplary implementations, the primary reactor zone consists of the reformer zone and the combustion zone, centrally located within the assembly. In still other configurations, a plurality of planar assemblies can be provided and stacked one atop the other to provide a modular reformer assembly of one or more individual assemblies.

In an aspect, the inlet reformate process fluid flow passage is provided and configured to be in thermal contact with the outlet reformate process flow passage and/or the outlet combustion fluid flow passage to promote transfer of heat from outlet fluid(s) to inlet fluid(s).

In some exemplary implementations, the inlet reformate process fluid flow passage is located circumferentially within the assembly. In still another aspect, the inlet combustion fluid flow manifold is divided into an inlet combustion air manifold and an inlet combustion fuel manifold. In one aspect of the disclosure, the inlet combustion fluid flow passage is provided such that it is divided into an inlet combustion air passage and an inlet combustion fuel passage. In still another particular aspect of one embodiment, the inlet reformate process fluid manifold is divided into an inlet water/steam manifold and inlet fuel/water/steam manifold. In another aspect, the inlet reformate process fluid flow passage can be provided dividing into an inlet water/steam passage and an inlet fuel/water/steam manifold. The inlet water/steam passage and the inlet fuel water/steam manifold can also be provided in a configuration such that they are connected prior to entering the reformer zone.

In some exemplary implementations, the thermal reformer system can include an outlet reformate process fluid flow passage divided into any one of a pre-shift flow passage, a shift reactor, and a post shift flow passage. In some examples, the pre-shift flow passage or the post shift flow passage are single or multiple passages that define a conduit connecting appropriate manifolds to a primary reactor zone. In some embodiments, the pre-shift flow passage and said post shift flow passage are provided in a counter-current configuration, respectively, such that flow therein flows in opposing directions. In other examples, the pre-shift flow passage and post shift flow passage are both provided in a configuration such that flows therein flow concordantly in same general direction within said planar assembly.

In some exemplary implementations, the thermal reformer system includes one or more of inlet reformate process fluid manifold, an outlet reformate process fluid manifold, an inlet combustion fluid manifold, an outlet combustion fluid manifold located externally to the planar assembly.

In some implementations, the assembly is constructed of sheet metal components. In some implementations, at least one of the an inlet reformate process fluid flow passage, outlet reformate process fluid flow passage, inlet combustion fluid flow passage, reformer zone and combustion zone are created by pressed sheet metal components and/or etched sheet metal components.

BRIEF DESCRIPTION OF DRAWINGS

The invention will be better understood by reference to the accompanying drawings, which represent exemplary implementations in accordance with the present disclosure.

DETAILED DESCRIPTION

Particular exemplary implementations are described below in considerable detail for the purpose of illustrating various teachings, principles and methods of operation. However, various modifications including, but not limited to scale, orientation and composition may be made and the scope of the disclosure is not limited to exemplary implementations described herein.

Figure 1A:
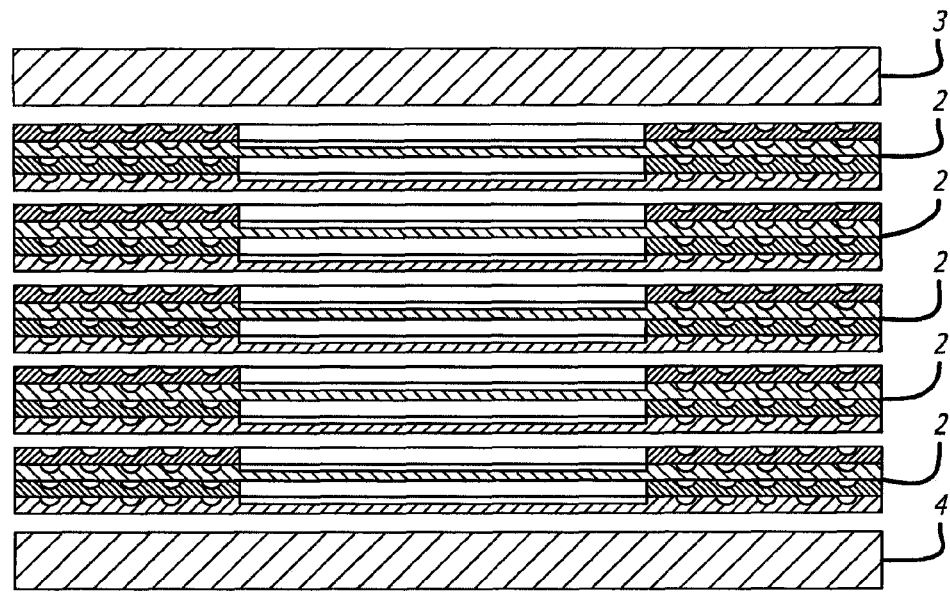
FIG. 1A illustrates a cross sectional view of an exemplary implementation of a modular reformer assembly having multiple modular reformer elements.

FIG. 1A illustrates a modular reformer assembly (1) constructed from multiple modular reformer elements (2) which have been stacked together. Also shown is the addition of a top end plate (3) and the bottom end plate (4) between which the planar modular reformer elements are assembled. The materials of construction can be any appropriate metal or ceramic material based on the temperature and pressures associated with the temperatures at which specific fuels are reformed. With hydrocarbon fuels such as but not limited to natural gas, gasoline, kerosene, diesels, propane, etc. the reforming and combustion reactions will be maintained at higher temperatures from 650 C to over 900 C, depending on the specific composition of the fuel. Alcohols and other oxygenated fuels can be reformed at lower temperatures from 250 C to 650 C. For metal based thermal reformers stainless steels are most appropriate, including but not limited to austenitic stainless steels, 300-series, 400-series, and the superalloy grades such as the high temperature Inconel 600-series and Hastelloy-series. Similarly, ceramic materials such as alumina, alumina doped with magnesium oxide, zirconia, yttria-stabilized zirconia, ceria, silicon nitride, silicon carbides, etc can be used in any embodiment of this thermal reformer, which provide the temperature and chemical compatibility required for a high temperatures and stability in the hydrogen rich environment.

Figure 1B:
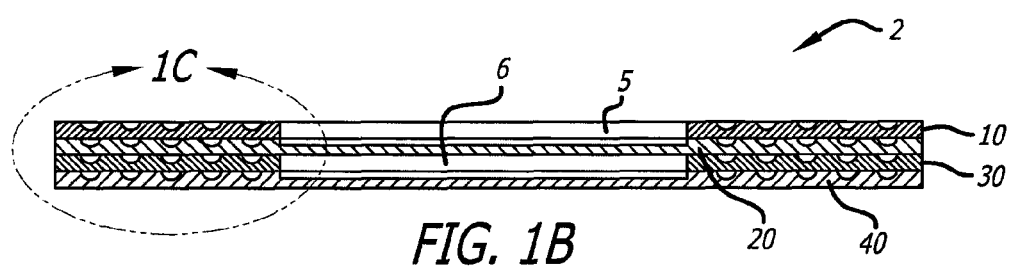
FIG. 1B illustrates a cross sectional view of individual components of a modular reformer element according to one embodiment.
Figure 1C:
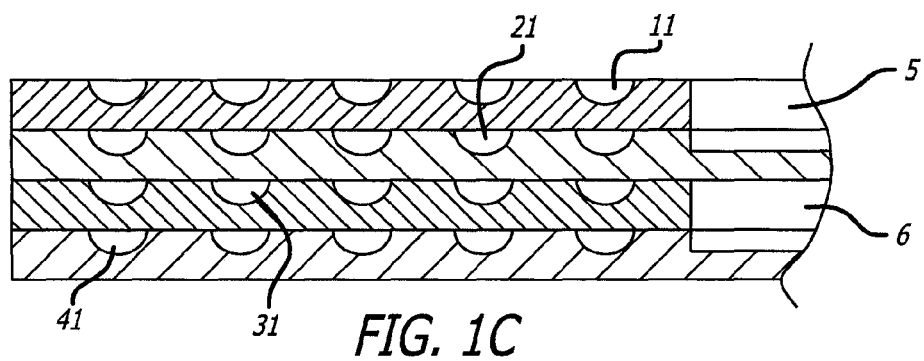
FIG. 1C illustrates a cross sectional view of inlet and outlet flow passages of a portion of FIG. 1B, according to one embodiment.

FIGS. 1B and 1C illustrate the modular reformer element (2) in greater detail. In this exemplary implementations, the modular reformer element (2) is constructed from four components. A first component is the reformate inlet component (10) which supports an inlet reformate process fluid flow passages (11). The second is the reformate outlet component (20) which supports the outlet reformate process fluid flow passages (21). The third is the combustion inlet component (30) which supports the inlet combustion fluid flow passages (31). The fourth is the combustion outlet component (40) which supports the outlet combustion fluid flow passages (41). In one embodiment, each component the fluid flow passages (11, 21, 31, and 41) are formed by chemical etching to a depth greater than 50% and preferably to 55% to 65%, but depths as high as 90% can be used depending on the initial thickness of the component. Other methods for forming the fluid flow passages (11, 21, 31, and 41) in their respective components can include, but are not limited to stamping, pressing and laser etching or other known etching technique. In some of these techniques the individual components (10, 20, 30, and 40) can be composed of two sheets: one sheet that has been cut completely through the thickness forming the volume for the fluid flow passages and reactions sections, while the other is not cut in the areas related to the fluid flow passages such that when the two sheets are stacked on to each other and bonded the general configuration is similar to the individual components (10, 20, 30, and 40) shown. The individual components can also be made of several sheets stacked and bonded together. For example the region of the component with fluid flow fields passages may be constructed from several sheets while the non-cut region can be a single sheet to provide appropriate isolation between the various fluid flow passages. The thickness of the individual sheets or layers (10, 20, 30, and 40) can be the same or different. Typically, the individual components (10, 20, 30, and 40) will be in the range of 0.1 to 50 mm thickness, and preferably in the range of 1 to 40 mm thickness, and most preferably in the range of 1 to 4 mm thickness.

FIGS. 1B and 1C illustrate a reformation cavity (5) and the combustion cavity (6). The reformation cavity (5) is created by completely etching away a reformation zone of the reformate inlet component (10) and approximately 60% etching of the reformation zone of the reformate outlet component (20). Similarly, the combustion cavity (6) is created by completely etching away the combustion zone of the combustion inlet component (30) and approximately 50% etching of the combustion zone of the combustion outlet component (40). Chemical etching is one preferred fabrication approach but other techniques are also applicable such as but not limited to compression forming, powder metal forming, casting, etc. The components can be constructed from metal or ceramic materials.

It is also contemplated that inlet reformate process fluid flow passages (11) and outlet reformate process fluid flow passages (21), can be provided on opposite sides of reformate inlet component (10) by utilizing appropriately shallow etching of passages and arrangements/stacking of components to maintain appropriate sealing of the various flow passages.

Figure 2A:
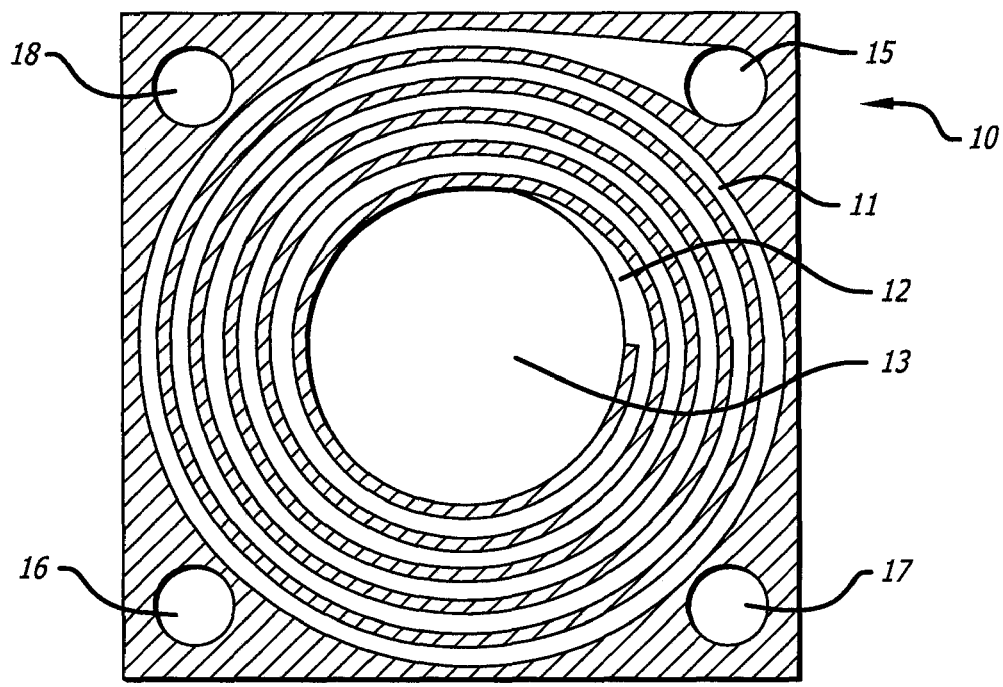
FIG. 2A is a top view illustrating an inlet side of a reformate inlet component of a reformation side of a modular reformer element.
Figure 2B:
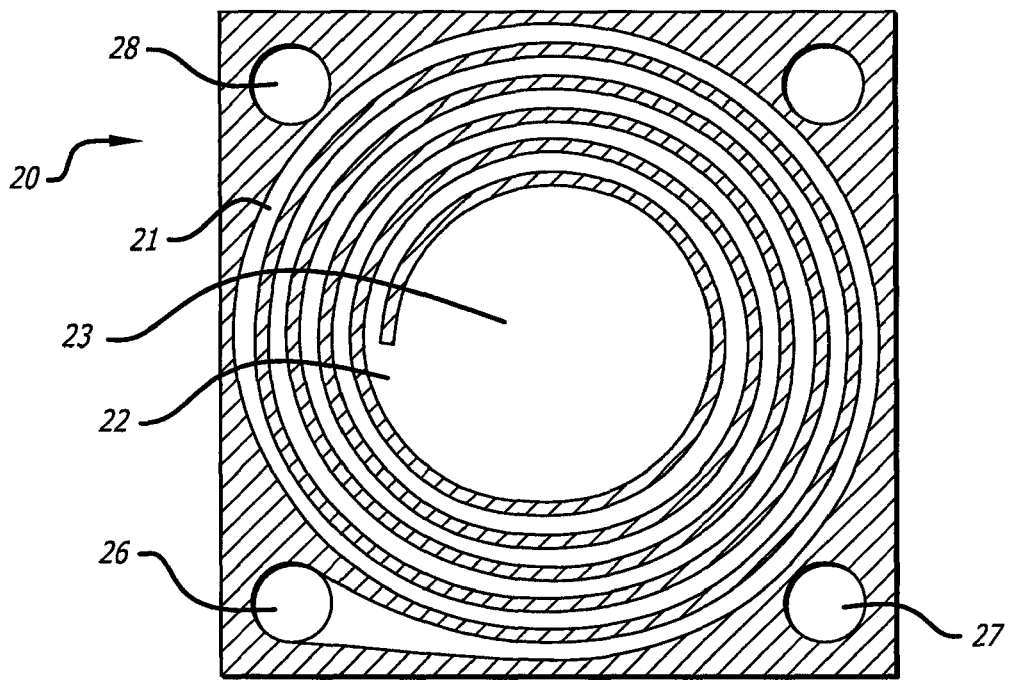
FIG. 2B is a top view illustrating an outlet side of a reformate outlet component of a reformation side of a modular reformer element.

FIGS. 2A and 2B illustrate a top view of the two components that create the reformation side of the modular reformer element. FIG. 2A illustrates a reformate inlet component (10) and FIG. 2b illustrates a reformate outlet component (20). Reformate inlet process fluids such as a fuel/water/steam mixture enter the assembly through inlet reformate process fluid manifold (15) and flows along the half etched inlet reformate process fluid flow passages (11) until it enters the inlet flow distribution region (12) and into the reformation cavity (5). The reformation cavity (5) is constructed by the fully etched region (13) of the reformate inlet component (10) and the partially etched region (23) of the reformate outlet component (20). Catalyst inserts can be used to provide high surface area structures in the reformation cavity (5). The reformate fluids exit the reformation cavity (5) and enter the outlet distribution region (22) of the outlet reformate process fluid flow passage (21). This fluid flows along the outlet reformate process fluid flow passage (21) and enters a reformate outlet manifold (26) which is in fluid connection with manifold (16) of the reformate inlet component (10). Also shown are manifold ports (17) and (27) trough which combustion inlet fluids flow and manifold ports (18) and (28) through which combustion outlet fluids flow.

Figure 2C:
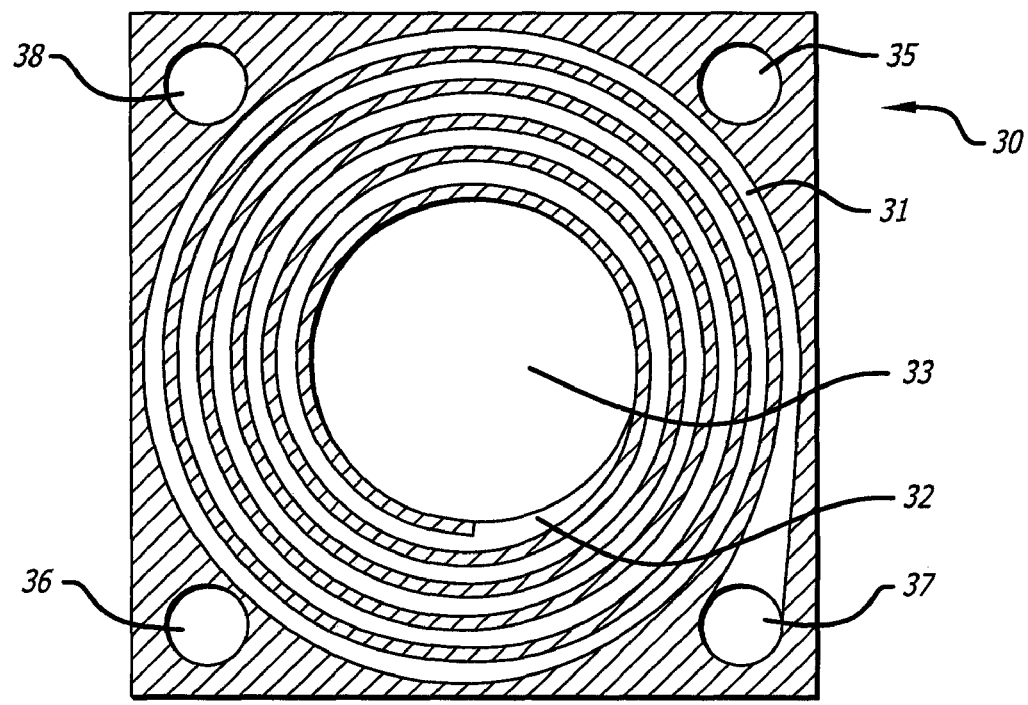
FIG. 2C is a top view illustrating the inlet side of a combustion inlet component of a combustion side of a modular reformer element.
Figure 2D:
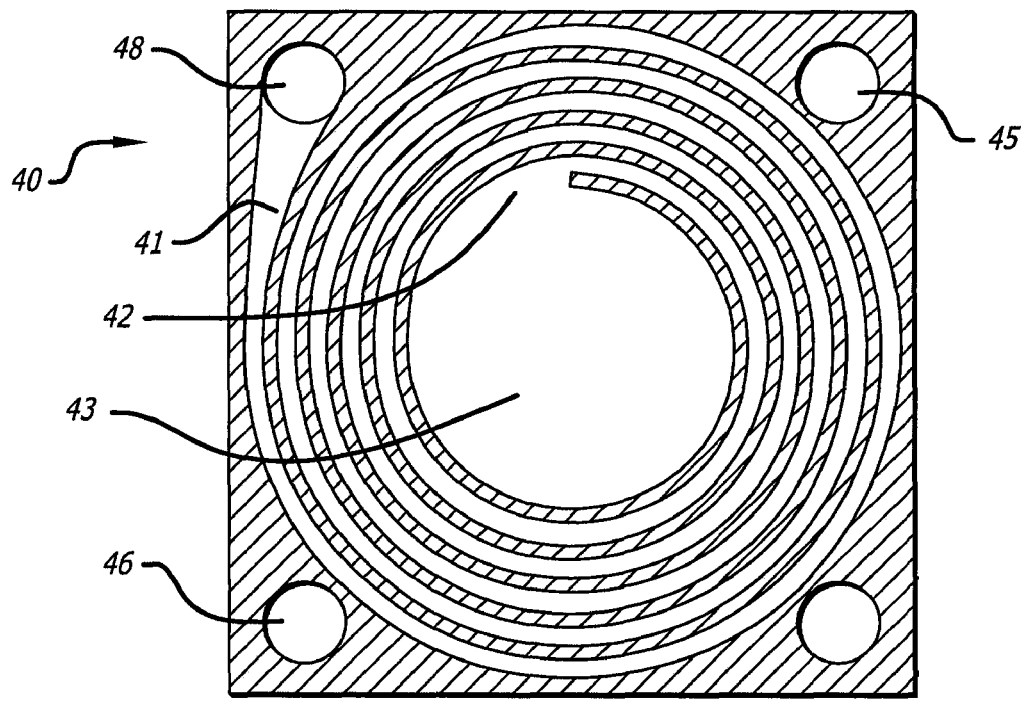
FIG. 2D is a top view illustrating the outlet side of a combustion outlet component of a combustion side of a modular reformer element.

FIGS. 2C and 2D also illustrate top views of two components that form the combustion side of the modular reformer element (2). FIG. 2C illustrates the combustion inlet component (30) and FIG. 2D illustrates the combustion outlet component (40). Combustion inlet process fluids such as air/off-gas/fuel mixture enter the assembly through combustion fluid inlet manifold (37) and flows along the half etched inlet combustion fluid flow passages (31) until it enters the combustion fluid flow distribution region (32) and into the combustion cavity (6). The combustion cavity (6) is constructed by the fully etched region (33) of the combustion inlet component (30) and the partially etched region (43) of the outlet combustion component (40). Catalyst (not illustrated) inserts can be used to provide high surface area structures in the combustion zone. The combustion exhaust fluid exits the combustion cavity (6) and enters the outlet distribution region (42) of the outlet combustion fluid flow passage (41). This fluid flows along the outlet combustion fluid flow passage (41) and enters the combustion outlet manifold (48) which is in fluid connection with manifold (38) of the reformate inlet component (10). Also shown are manifold ports (35) and (45) through which reformate inlet fluids flow and manifold ports (36) and (46) through which reformate outlet fluids flow.

This implementation provides one example of the aspect disclosed herein. The planar modular reformer with integrated thermal energy recuperation is constructed using four sheet metal plate components each with chemically etched surfaces and integrated manifolds. An aspect configuration can be achieved using pressed plate components or cast components. The materials could also be ceramic or metal ceramic composites similar to those disclosed above. A feature disclosed herein integrates the thermal recuperative heat exchange area created by fluid passages (11, 21, 31, and 41) within the planar assembly such that the outlet fluids transfer most of their thermal energy into the inlet fluids and such that much of this recuperation occurs along the outer edges of the assembly to minimize heat loss and insulation requirements due to the efficiency of counter current exchange of thermal energy between the outlet fluids (having increased thermal energy as they emanate from the centrally located respective combustion and reformation cavities) and incoming inlet fluids (which contain relatively lower thermal energy as they are fed into their respective channels and towards the core) on their way to their respective combustion and reformation cavities. Shown in FIGS. 2A and 2B, are incoming process fluids such as a fuel/water/steam mixture enter the assembly through inlet reformate process fluid manifold (15) and flow along the half etched inlet reformate process fluid flow passages (11) in a counter-clockwise fashion until it enters the inlet flow distribution region (12) and into the reformation cavity (5) and then after reformation has taken place, reformate fluids exit the reformation cavity (5) and enter the outlet distribution region (22) of the outlet reformate process fluid flow passage (21) which flows along the outlet reformate process fluid flow passage (21) in a clockwise fashion oppositely of the flow of incoming process fluids. This counter current outlet and inlet fluid flow maximizes the overall process efficiency by efficient heat transfer, minimizing the amount of energy required in the combustion section and insulation requirements. A similar configuration is likewise provided in the combustion portion of the planar modular reformer (see FIGS. 2C and 2D).

Another aspect shown includes the integrated manifolds that support the stacking of the modular reformer elements (2), one on top of the other and providing capacity flexibility without extensive re-engineering. If each element assembly is designed with sufficient catalyst volume for 1 kWe hydrogen, then a stack of five modular reformer elements (2), as illustrated in FIG. 1a, would provide sufficient hydrogen for a 5 kWe application. Similarly, twenty-five elements could be used for a small commercial application requiring 25 kWe of energy. The fluid flow manifolds are sized for the maximum number of elements in a stack, and a system of greater capacity can be achieved by using external manifolds between individual stacks. The planar configuration also supports maximizing the direct heat transfer area between the reformer and the combustion zones and fluid flow passages (e.g. transfer of heat energy from outlet fluid flow passages to inlet fluid flow passages). This further supports higher efficiency and allows lower temperatures within the combustion zone.

Figure 3:
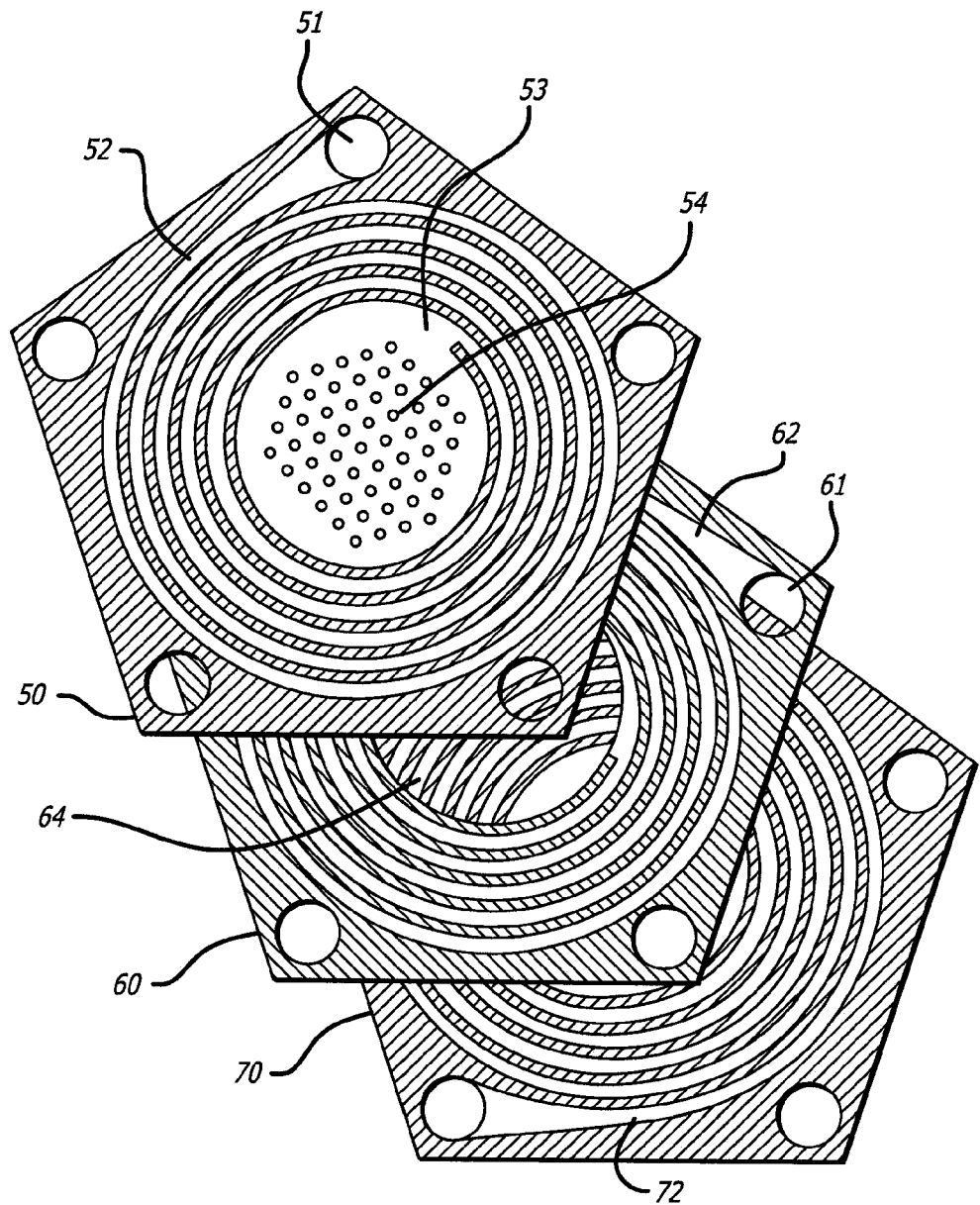
FIG. 3 is an illustration of an exemplary implementation in which the combustion side of a modular reformer element is constructed from three sheets, a combustion fuel inlet sheet, a combustion air inlet sheet, and a combustion exhaust sheet.

FIG. 3 illustrates a configuration that minimizes combustion temperatures by dividing the combustion gas inlet manifold and passage into two parallel passages and using a distributed combustion configuration. For example, the combustion side of the modular reformer element (2) can be designed as three separate layers, one for the combustion fuel inlet (50), one for combustion air inlet (60) and one for combustion exhaust outlet (70). The combustion fuel enters through port (51) flows along passage (52) and enters fuel distribution zone (53). The fuel flows through distribution holes (54) and into the combustion zone (64). The combustion air enters through port (61) flows along passage (62) and enters combustion zone (64) where it reacts with the fuel flowing through holes (54). The heat generated is transferred into the reformer zone (not illustrated) and the distributed combustion helps maintain uniform temperatures within both the combustion zone (64) and the reformer zone (other side of modular reformer element (2)). The combustion exhaust fluids exit the combustion zone and flow into passage (72) transferring heat into the inlet fluids in passages 52 and 62 of combustion fuel inlet (50) and combustion air inlet (60), respectively. Heat can also be transferred into inlet process fluids flowing through the reformate component (not illustrated). The pattern of the distributed combustion holes (54) can be tailored to create uniform and controlled temperature distributions within the combustion zone.

Figure 4:
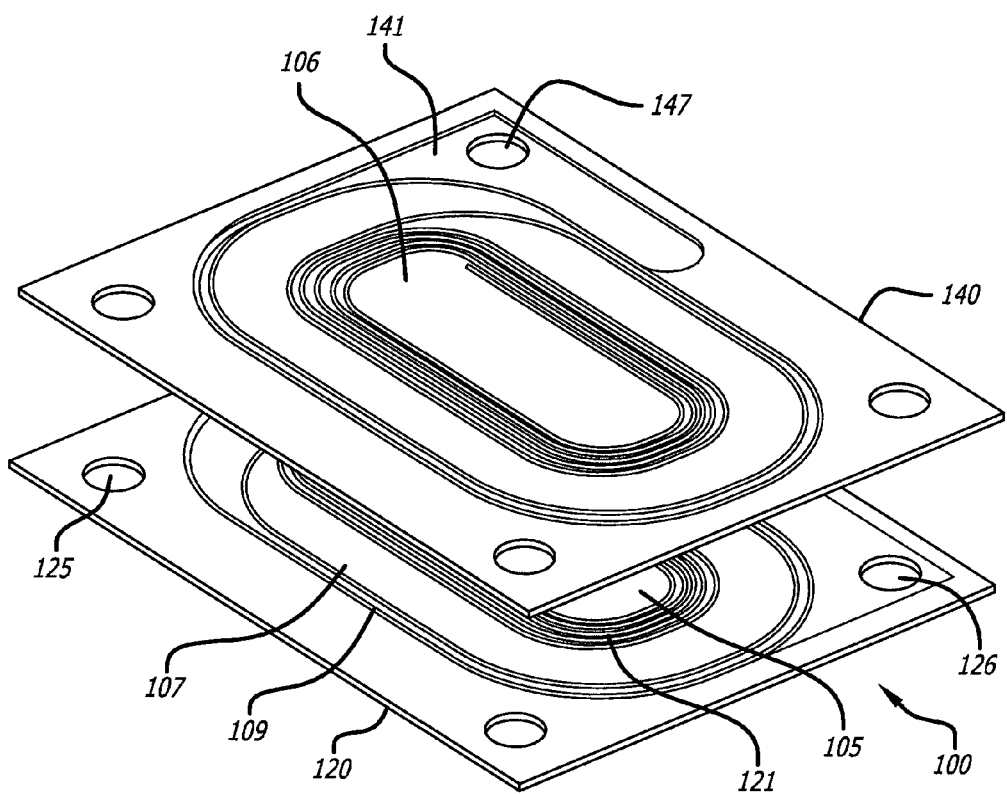
FIG. 4 is an illustration of an exemplary implementation, in which an outlet reformate fluid flow passage is modified to include a shift reactor section.

FIG. 4 illustrates an implementation that improves the hardware (100) by separating the reformate outlet fluid passage into an outlet reformate passage (121), a shift reactor passage (107), and an shift outlet passage (109). This implementation illustrates a reformer subassembly (120) and combustion subassembly (140). The outlet side of the combustion subassembly (140) is visible illustrating combustion outlet manifold (147), the end of the outlet combustion passage (141),and the combustion zone (106). The outlet side of the reformer subassembly (120) is visible. The reformate gases flow from the reformer zone (105), into the outlet reformer passage (121) which circulates around the reformer zone (105) providing heat to the inlet reformer fluids contained within the subassembly (not illustrated). These gases then enter the shift reactor zone (107) which also circulates around the central zones and eventually exits into the outlet passage (109) and eventually outlet manifold (126). In this implementation the combustion inlet fluid flow passages (not shown) is contained within the thickness of subassembly (140) and the combustion outlet fluid flow passage (141) terminating at manifold (147) do not flow through the closed region of subassembly (140). This region can therefore be opened up to the be in fluid communication with the shift reactor zone (107) to increase the volume of the shift reactor zone (107). The water gas shift function of the fuel processor are integrated into the modular assembly.

Some reformer implementations herein disclosed are planar in geometry with integrated manifolds to support stacking of multiple modular reformer elements (2) which provides flexibility in reformer capacity without major engineering redesigns. The modular reformer elements are designed such that process fluids typically flow from the outer edges of the individual modular reformer elements inward toward the higher temperature combustion and reforming zones, while the exhaust and outlet fluids typically flow outward from the higher temperature zones. This configuration promotes thermal recuperation between the inlet and outlet process and combustion fluids which in turn increases process efficiency and reduces thermal energy loss from the external surfaces.

A thermal reformer system may include a planar assembly including a reformer zone, a combustion zone, an inlet reformate process fluid manifold, an outlet reformate process fluid manifold, an inlet combustion fluid manifold, an outlet combustion fluid manifold, an inlet reformate process fluid flow passage connecting the inlet manifold and the reformer zone, an outlet reformate process fluid flow passage connecting the reformer zone and the outlet reformate process fluid manifold, an inlet combustion fluid flow passage connecting the inlet combustion fluid manifold and the combustion zone, and an outlet combustion fluid flow passage connecting the combustion zone and the outlet combustion fluid manifold. The reformer zone and combustion zone may be in thermal contact to promote transfer of combustion heat into the reformer zone driving the reaction. A primary reactor zone may be present consisting of the reformer zone and the combustion zone which are centrally located within the assembly, and the planar assemblies can be stacked to create a modular reformer assembly of one or more individual assemblies.

In addition, the inlet reformate process fluid flow passage may be in thermal contact with the outlet reformate process flow passage and/or the outlet combustion fluid flow passage to promote transfer of heat from the outlet fluid(s) to said inlet fluid(s). Further, the inlet reformate process fluid flow passage may be located circumferentially within the assembly to minimize circumferential temperature of the assembly.

The inlet combustion fluid flow manifold may be divided into a inlet combustion air manifold and an inlet combustion fuel manifold. The inlet combustion fluid flow passage may be divided into a inlet combustion air passage and an inlet combustion fuel passage to minimize the likelihood of combustion prior to entering the combustion zone.

The inlet reformate process fluid manifold may be divided into a inlet water/steam manifold and an inlet fuel/water/steam manifold. The inlet reformate process fluid flow passage may divided into a inlet water/steam passage and an inlet fuel/water/steam manifold, and the inlet water/steam passage and the inlet fuel water/steam manifold may be connected prior to entering the reformer zone.

The inlet water/steam passage may be used to dynamically control the temperature of the outlet reformate fluid along the outlet reformate fluid flow passage. The outlet reformate process fluid flow passage may be divided into pre-shift flow passage, a shift reactor, and a post shift flow passage. The flow pass may be single or multiple passages connecting the manifolds and the primary reactor zone. The flow passages may have a clockwise or counter-clockwise direction or may have both a clockwise and counter-clockwise direction or any combination of directions within the planar assembly.

Further, the assembly may be constructed of sheet metal components and the flow passages and reactor zones may be created by pressed sheet metal components. The inlet flow passages and the outlet flow passages may be formed on opposite sides of the pressed sheet metal component. The flow passages and rector zones may be created by chemically etched sheet metal components. Similarly, the assembly may constructed of ceramic components and one or more of the manifolds may be external to the assembly.

While specific implementations have been illustrated and described herein for illustrative purposes, it is realized that modifications and changes will occur to those skilled in the art. It is therefore to be understood that the appended claims are intended to cover all such modifications and changes as fall within the true spirit and scope of the invention.

The invention claimed is:

1. A modular thermal reformer assembly, comprising:
   a top end plate;
   a bottom end plate; and,
   a plurality of planar modular reformer elements stacked together between the top end plate and the bottom end plate; wherein each modular element comprises:
   a reformate inlet component layer;
   a reformate outlet component layer;
   a combustion inlet component layer;
   a combustion outlet component layer; and a reformation cavity and combustion cavity centrally located within the modular reformer element;
   wherein the reformate inlet component layer comprises an inlet reformate manifold located at an outer edge of the reformate inlet component layer, an inlet reformate process fluid flow passage , and an inlet flow distribution region, wherein the inlet reformate manifold allows for entry of a reformate process fluid into the inlet reformate process fluid flow passage for the inward flow of reformate process fluid towards the inlet flow distribution region and into the centrally located reformation cavity; and, wherein the reformate outlet component layer comprises a reformate outlet manifold located at an outer edge of the reformate outlet component layer, an outlet reformate process fluid flow passage and an outlet distribution region, wherein the outlet reformate process fluid flow passage allows for the outward flow of reformate process fluid from the centrally located reformation cavity and the outlet distribution region and the reformate outlet manifold allows for the exit of reformate process fluid from the outlet reformate process fluid flow passage.

2. The assembly of claim 1, wherein said inlet reformate process fluid flow passage is located circumferentially within the assembly extending counter-clockwise from the inlet reformate manifold located at an outer edge of the reformate inlet component layer towards the inlet flow distribution region and into the centrally located reformation cavity, and wherein the outlet reformate process fluid flow passage extends clockwise from the centrally located reformation cavity and the outlet distribution region towards the reformate outlet manifold located at an outer edge of the reformate outlet component layer.

3. The modular thermal reformer assembly of claim 1, wherein the reformate outlet manifold is in fluid connection with a manifold of the reformate inlet component layer.

4. The modular thermal reformer assembly of claim 1, wherein the combustion inlet component layer comprises a combustion inlet manifold located at an outer edge of the combustion inlet component layer, an inlet combustion process fluid flow passage and a combustion fluid flow distribution region, wherein the a combustion inlet manifold allows for entry of a combustion process fluid into the inlet combustion process fluid flow passage for the inward flow of combustion process fluid towards the combustion fluid flow distribution region and into the centrally located combustion cavity; and, combustion outlet component layer comprises a combustion outlet manifold located at an outer edge of the combustion outlet component layer, an outlet combustion process fluid flow passage and an outlet distribution region, wherein the outlet combustion process fluid flow passage allows for the outward flow of combustion process fluid from the centrally located combustion cavity and the outlet distribution region and the combustion outlet manifold allows for exit of the combustion process fluid from the outlet combustion process fluid flow passage.

5. The assembly of claim 4, wherein the reformate inlet component layer and combustion inlet component layer are in thermal contact to promote transfer of combustion heat into the reformate inlet component layer.

6. The assembly of claim 4, wherein said inlet combustion process fluid flow passage is in thermal contact with said outlet combustion process flow passage.

7. The assembly of claim 4 wherein the inlet combustion process fluid flow passage extends counter-clockwise from the combustion inlet manifold located at an outer edge of the combustion inlet component layer towards the combustion fluid flow distribution region and into the centrally located combustion cavity, and wherein the outlet combustion process fluid flow passage extends clockwise from the centrally located combustion cavity and the outlet distribution region towards the combustion outlet manifold located at an outer edge of the combustion outlet component layer.

8. The modular thermal reformer assembly of claim 1, wherein inlet combustion process fluids flow to the combustion inlet manifold through a manifold port of the reformate inlet component layer and a manifold port of the reformate outlet component layer; and, wherein the combustion outlet manifold is in fluid connection with a manifold of the combustion inlet component layer, a manifold port of the reformate outlet component layer, and a manifold port of the reformate inlet component layer.

9. The modular thermal reformer assembly of claim 1, wherein inlet reformate process fluids flow through a manifold port of the combustion inlet component layer and a manifold port of the combustion outlet component layer, and wherein outlet reformate process fluids flow through a manifold port of the combustion inlet component layer and a manifold port of the combustion outlet component layer; and, wherein the reformation cavity is in thermal contact with the combustion cavity.

* * * * *